(No Model.)
A. D. BARKER.
BICYCLE.
No. 434,234. Patented Aug. 12, 1890.
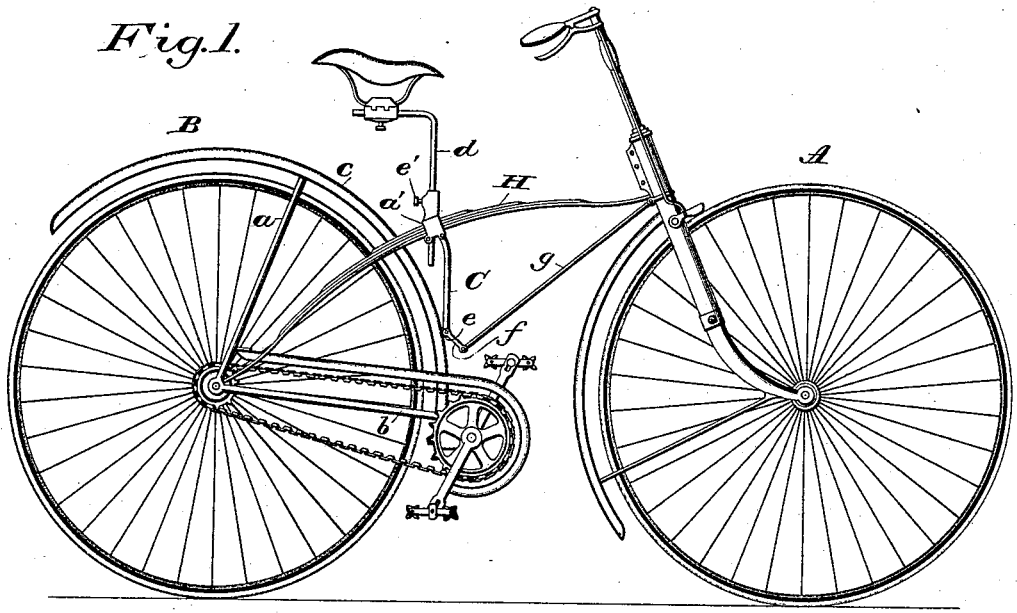
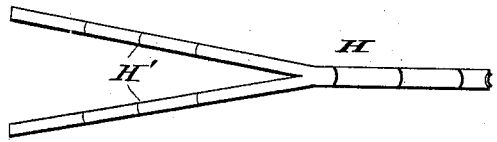
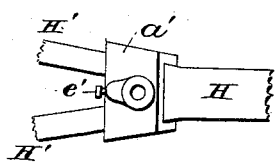 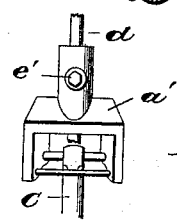
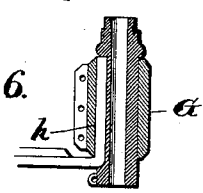 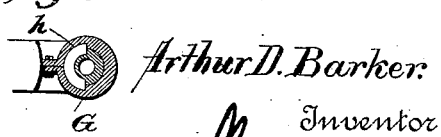
Witnesses
Arthur D. Barker.
Inventor
by
Attorney
THE NORRIS PETERS CO., PHOTO-LITHO., WASHINGTON, D. C.

UNITED STATES PATENT OFFICE.

ARTHUR D. BARKER, OF GRINNELL, IOWA.

BICYCLE.

SPECIFICATION forming part of Letters Patent No. 434,234, dated August 12, 1890.

Application filed June 20, 1890. Serial No. 356,153. (No model.)

*To all whom it may concern:*

Be it known that I, ARTHUR D. BARKER, a citizen of the United States of America, residing at Grinnell, in the county of Poweshiek and State of Iowa, have invented certain new and useful Improvements in Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in rear-driven Safety bicycles, the object thereof being to provide a Safety bicycle with a spring perch, backbone, or reach, which extends from the front fork to the rear axle.

The invention also contemplates the employment of jointed bars, which are connected to the backbone or reach, so as to permit a vertical spring movement of the backbone without impairing the parallelism of the front and rear wheels; and the invention consists in the employment of a backbone made up of a single piece of spring metal which extends from the rear axle to the head of the front fork, said reach or backbone being re-enforced by plates or leaves, and the employment and connection therewith of bars, which may extend from the front end of said spring or the steering-head downwardly and rearwardly to links connected to a rigid portion of the frame.

In the accompanying drawings, forming part of this specification, Figure 1 is a side view of a Safety bicycle embodying my improvements. Fig. 2 is a plan view of the spring-reach or backbone. Fig. 3 is a plan view showing the parallel connecting-bars, which extend from near the front portion of the spring to a fixed portion of the machine. Figs. 4 and 5 are detail views of the saddle-support, and Figs. 6 and 7 are sectional views showing the manner of connecting the backbone to the front fork.

A refers to the steering-wheel and B to the driving-wheel, which are mounted upon axles in the usual manner, the rear wheel being provided with a sprocket-wheel over which passes the driving-chain operated by the sprocket-wheel, to which the treadles are attached in the usual manner. The rear wheel has a rigid frame consisting of bars $a$ and $b$, carrying the dust-guard $c$, these parts forming a rigid connection, to which the pedal-shaft is journaled, as shown. The rear dust-guard passes through the bifurcated portion of the backbone or spring-reach, and said dust-guard is connected to the reach by a link C, attached at its upper end to a forging or clamp $a'$ and at its lower end to an offset formed on the dust-guard. The seat-supporting bar $d$ passes through the forging or clamp $a'$, and also through the bifurcated portion of the spring and is adjustable vertically by means of a set-screw $e'$, and this seat-supporting rod is provided with the usual rearwardly-bent portion, as shown.

To the offset $e$ on the rear dust-guard is journaled or pivoted the link C, and to said offset is also secured a connection or casting $f$, having projecting portions through which passes a pivot-bolt, and to the lower or forward end of this casting is attached rods $g\ g$, which are pivoted beneath the forward end of the spring to the collar or neck G, through which passes the steering-handle, said handle being connected to the front forks in the usual manner. This collar G is also provided with a recess $h$, within which lies the upturned end of the main leaf of the spring-reach H. The lower or main plate of the spring is made up of a single piece of metal bent in proper form to give a pleasing curve to the same, and the rear portion of this plate is bifurcated to present the diverging members H′, the ends of which are formed into eyes to embrace the rear axle. This spring-reach is re-enforced by three or more plates or leaves, which are connected to each other by the clamp or forging $a'$, hereinbefore referred to.

A bicycle having a backbone or reach constructed as herein described will ride easily, and the seat can have an up-and-down movement, and as the pedals are connected by practically a rigid joint the same distance will be maintained between the pedals and saddle at all times, while the spring motion merely increases the distance between the axles and does not impair the parallelism of the wheels and in no way interferes with the steering.

A bicycle could be constructed without the parallel bars and flexible connections herein described, but with sudden shocks or jolts the front wheel would be liable to twist or turn, and though such a bicycle could be ridden by an expert rider to advantage it is desirable to provide such a bicycle with the connections hereinbefore described.

Having thus described my invention, I claim—

1. In a rear-driven Safety bicycle, a backbone or reach made up of a spring-plate connected to the head of the front forks and bifurcated for connection to the rear axle, said spring having a seat-supporting bar connected thereto, substantially as set forth.

2. In a rear-driven Safety bicycle, a backbone or reach connecting the front and driving wheels, said backbone being connected with the front forks and to the rear axle, and a rigid frame carried by the rear axle and connected to the backbone or spring-reach by a bar, substantially as set forth.

3. A spring-reach or backbone for Safety bicycles having a front portion which is connected to the neck or head of the front forks, a bifurcated rear portion embracing the hind axle, re-enforcing leaves or plates connected thereto, a clamp for connecting the leaves and supporting the saddle-post, and means for connecting the backbone to a rigid frame carrying the driving-axle, substantially as set forth.

4. In a rear-driven Safety bicycle, a spring-reach or backbone extending from the junction of the front forks rearwardly and downwardly to the rear axle, a rigid frame supporting the driving mechanism, means for connecting the spring-reach with the rigid frame, and movable bars connected with the rear rigid frame and front forks, substantially as set forth.

5. The combination, in a rear-driven Safety bicycle having a spring or flexible backbone, of a rigid frame carrying the driving mechanism, means for connecting the driving mechanism with the backbone so that they can move in unison, and links extending from the front forks and connected to a movable section for preventing the twisting or turning of the front frame irrespective of the handle-bars, substantially as set forth.

6. The combination, in a rear-driven Safety bicycle, of a spring-reach, means for connecting the same with a rear rigid frame which supports the driving mechanism, and jointed or linked bars connecting said rear frame with the front forks, substantially as set forth.

7. As an improved article of manufacture, a spring-reach for Safety bicycles, the main leaf thereof having its bifurcated portion or rear lower ends provided with means for attaching the same to the rear axle, the front end thereof being bent upwardly and rounded for attachment to the head, substantially as shown.

In testimony whereof I affix my signature in presence of two witnesses.

ARTHUR D. BARKER.

Witnesses:
R. M. HAINES,
S. M. BARTLETT.